US012589415B2

(12) United States Patent
Lee

(10) Patent No.: US 12,589,415 B2
(45) Date of Patent: Mar. 31, 2026

(54) SUBSTRATE TREATMENT APPARATUS

(71) Applicant: DEVICE CO., LTD., Chungcheongnam-do (KR)

(72) Inventor: Taek Youb Lee, Cheonan (KR)

(73) Assignee: DEVICE CO., LTD., Chungcheongnam-do (KR)

( * ) Notice: Subject to any disclaimer, the term of this patent is extended or adjusted under 35 U.S.C. 154(b) by 113 days.

(21) Appl. No.: 18/423,810

(22) Filed: Jan. 26, 2024

(65) Prior Publication Data

US 2025/0050381 A1 Feb. 13, 2025

(30) Foreign Application Priority Data

Aug. 8, 2023 (KR) ........................ 10-2023-0103737

(51) Int. Cl.
*B08B 3/02* (2006.01)
*B08B 13/00* (2006.01)

(52) U.S. Cl.
CPC ................ *B08B 3/02* (2013.01); *B08B 13/00* (2013.01); *B08B 2203/0211* (2013.01)

(58) Field of Classification Search
None
See application file for complete search history.

(56) References Cited

U.S. PATENT DOCUMENTS 9,355,835 B2 5/2016 Lee
2012/0260946 A1* 10/2012 Ogata ............... H01L 21/67051 134/33

FOREIGN PATENT DOCUMENTS

JP 910658 A 1/1997
JP 2003179041 A 6/2003

OTHER PUBLICATIONS

JP 2003179041 A Espacenet translation, Apparatus and Method for Processing Substrate, Tanaka (Year: 2003).*

* cited by examiner

*Primary Examiner* — Cristi J Tate-Sims
(74) *Attorney, Agent, or Firm* — Blank Rome LLP

(57) ABSTRACT

The present disclosure relates to a substrate treatment apparatus including: a substrate treatment apparatus including: a chuck base rotating together with a substrate in a state of supporting the substrate thereagainst; a fluid supply unit for supplying treatment liquid to the substrate; a bowl assembly having a plurality of bowls that overlap outward in a radial direction with respect to the center of the substrate in such a way as to surround the chuck base; an ascending and descending unit for moving the bowl assembly up and down; and a shutter unit disposed on top of the outermost bowl of the bowl assembly to adjust a radius of an air flow inlet through which air flow passes toward the substrate.

6 Claims, 10 Drawing Sheets

PRIOR ART

SUBSTRATE TREATMENT APPARATUS

BACKGROUND OF THE DISCLOSURE

Cross Reference to Related Application of the Disclosure

The present application claims the benefit of Korean Patent Application No. 10-2023-0103737 filed in the Korean Intellectual Property Office on Aug. 8, 2023, the entire contents of which are incorporated herein by reference.

Field of the Disclosure

The present disclosure relates to a substrate treatment apparatus, more specifically to a substrate treatment apparatus that is capable of adjusting an opening and closing rate above a substrate to control the speed of air flow.

Background of the Related Art

Generally, a substrate treatment apparatus is an apparatus that performs, with the use of treatment liquids, various processes such as deposition, photolithography, etching, and cleaning for substrates such as semiconductor wafers, substrates for display, optical disk substrates, magnetic disk substrates, photomask substrates, ceramic substrates, solar cell substrates, and the like.

Among the processes, the cleaning process is performed to remove foreign substances or particles from the substrate, and representatively, treatment liquid is supplied to top or underside of a substrate to perform the cleaning process for the substrate, while the substrate is rotating at a high speed in a state of being supportedly placed on top of a chuck base (spin head).

As shown in FIG. 1, a general substrate treatment apparatus 1 includes a fluid supply unit 30, a bowl assembly 10, an ascending and descending unit 60, and a substrate support assembly 20 having a chuck base 21.

The fluid supply unit 30 supplies treatment liquids (chemical liquids) or gases for treating a substrate W to the substrate W.

The substrate support assembly 20 serves to rotate the substrate W in a state of supporting the substrate W, while a given treatment is being carried out.

The bowl assembly 10 serves to receive chemical liquids used for treatments and fumes generated during the treatments to prevent the chemical liquids and fumes from scattering or flowing to the outside and has a overlapped structure of bowls so that different types of chemical liquids and fumes are separately introduced for each of passages formed by the plurality of bowls.

The ascending and descending unit 60 serves to move the substrate support assembly 20 or the bowl assembly 10 up and down to change a relative height between the bowl assembly 10 and the substrate support assembly 20 within the bowl assembly 10.

Further, the fluid supply unit 30, the bowl assembly 10, the ascending and descending unit 60, and the substrate support assembly 20 having the chuck base 21 are accommodated into a chamber 80, and a fan filter unit (FFU) 81 is located on top of the chamber 80 to supply external air to the interior of the chamber 80. Next, the air supplied is exhausted to the outside of the chamber 80 through the bowl assembly 10 and an exhaustion member 40.

In the conventional technology, like this, if the fan filter unit 81 operates, the flow of air is formed at a regular speed toward the substrate W so that gas-phase particles contained in the flow of air are adhered to the substrate W, thereby undesirably causing the substrate W to be defective.

That is, numerous gas-phase particles are contained in the flow of air, and if the flow of air becomes slow, the gas, which is not exhausted yet to the outside of the substrate W and thus flows above the substrate W, is adhered again to the substrate W, thereby having a bad influence on the quality of substrate W.

SUMMARY OF THE DISCLOSURE

Accordingly, the present disclosure has been made in view of the above-mentioned problems occurring in the related art, and it is an object of the present disclosure to provide a substrate treatment apparatus that is capable of adjusting an opening and closing rate above a substrate to control the speed of air flow, thereby preventing the substrate from being deteriorated in quality due to particles adhered thereonto.

To accomplish the above-mentioned objects, according to the present disclosure, there is provided a substrate treatment apparatus including: a chuck base rotating together with a substrate in a state of supporting the substrate thereagainst; a fluid supply unit for supplying treatment liquid to the substrate; a bowl assembly having a plurality of bowls that overlap outward in a radial direction with respect to the center of the substrate in such a way as to surround the chuck base; an ascending and descending unit for moving the bowl assembly up and down; and a shutter unit disposed on top of the outermost bowl of the bowl assembly to adjust a radius of an air flow inlet through which air flow passes toward the substrate.

According to the present disclosure, desirably, the shutter unit may include: a housing frame disposed on top of the outermost bowl; a shutter member disposed between the top of the outermost bowl and the housing frame to adjust the radius of the air flow inlet; and shutter driving member connected to the shutter member to apply forces to the shutter member so that the radius of the air flow inlet is adjusted.

According to the present disclosure, desirably, the shutter member may have a plurality of shutter blades equally spaced apart from one another in a circumferential direction of the outermost bowl in such a way as to extend in a rotational direction of the substrate, while being continuously overlaid on top of one another in the rotational direction of the substrate.

According to the present disclosure, desirably, between the top of the outermost bowl and the housing frame may be formed a cleaning liquid supply part adapted to supply a cleaning liquid to the shutter blades.

According to the present disclosure, desirably, the cleaning liquid supply part may be a cleaning liquid flow path extending in the circumferential direction in such a way as to be open toward the center of the shutter member.

According to the present disclosure, desirably, while the cleaning liquid is being supplied by the cleaning liquid supply part, the shutter blades may be repeatedly folded and unfolded.

According to the present disclosure, desirably, the shutter member may include: the plurality of shutter blades equally spaced apart from one another in the circumferential direction of the top of the outermost bowl in such a way as to be hingeable around hinge points formed on the top of the outermost bowl; and a blade moving ring-shaped part whose one side is connected to the shutter driving member and the other side is connected relatively rotatable to the shutter blades and having a through hole penetrating into the center thereof.

According to the present disclosure, desirably, the shutter member may include: the plurality of shutter blades equally spaced apart from one another in the circumferential direction of the top of the outermost bowl in such a way as to be hingeable around the hinge points formed on the top of the outermost bowl; and the blade moving ring-shaped part whose one side is connected to the shutter driving member and the other side is connected relatively rotatable to the shutter blades and having a through hole penetrating into the center thereof, the blade moving ring-shaped part being disposed between the housing frame and the outermost bowl to face the cleaning liquid flow path.

BRIEF DESCRIPTION OF THE DRAWINGS

The above and other objects, features and advantages of the present disclosure will be apparent from the following detailed description of the embodiments of the disclosure in conjunction with the accompanying drawings, in which.

DETAILED DESCRIPTION OF THE PREFERRED EMBODIMENT

Hereinafter, an embodiment of the present disclosure will be explained in detail with reference to the attached drawings.

Figure 1:
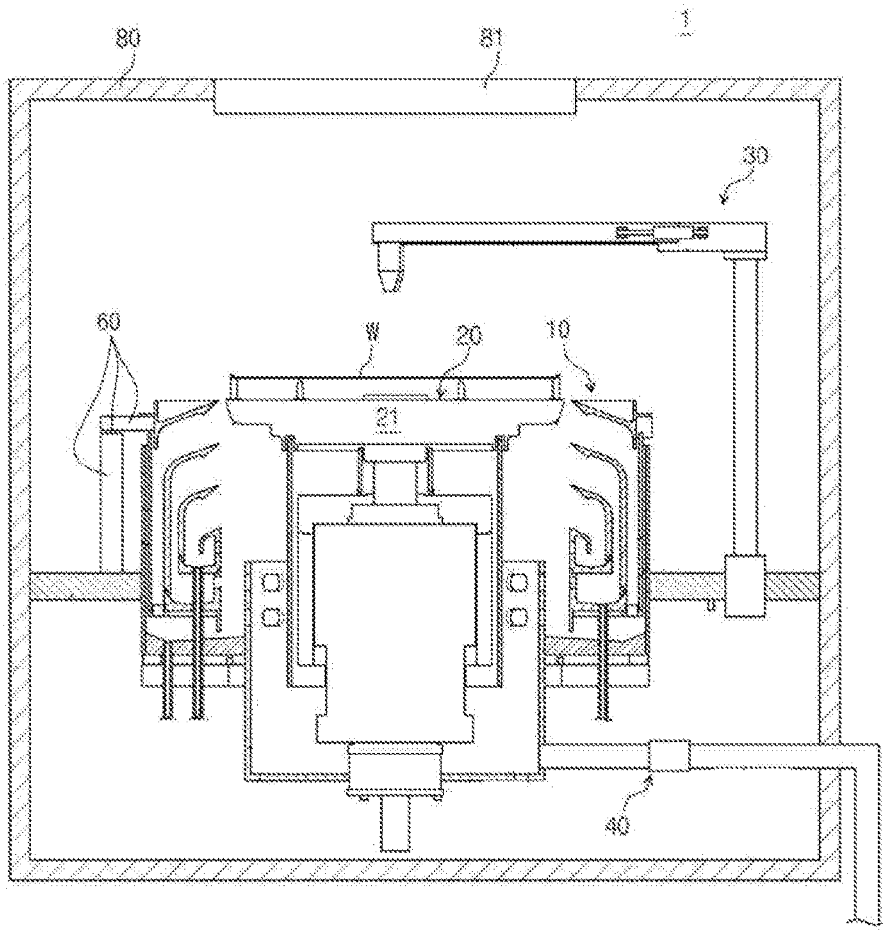
FIG. 1 is a longitudinal sectional view showing a conventional substrate treatment apparatus.
Figure 2:
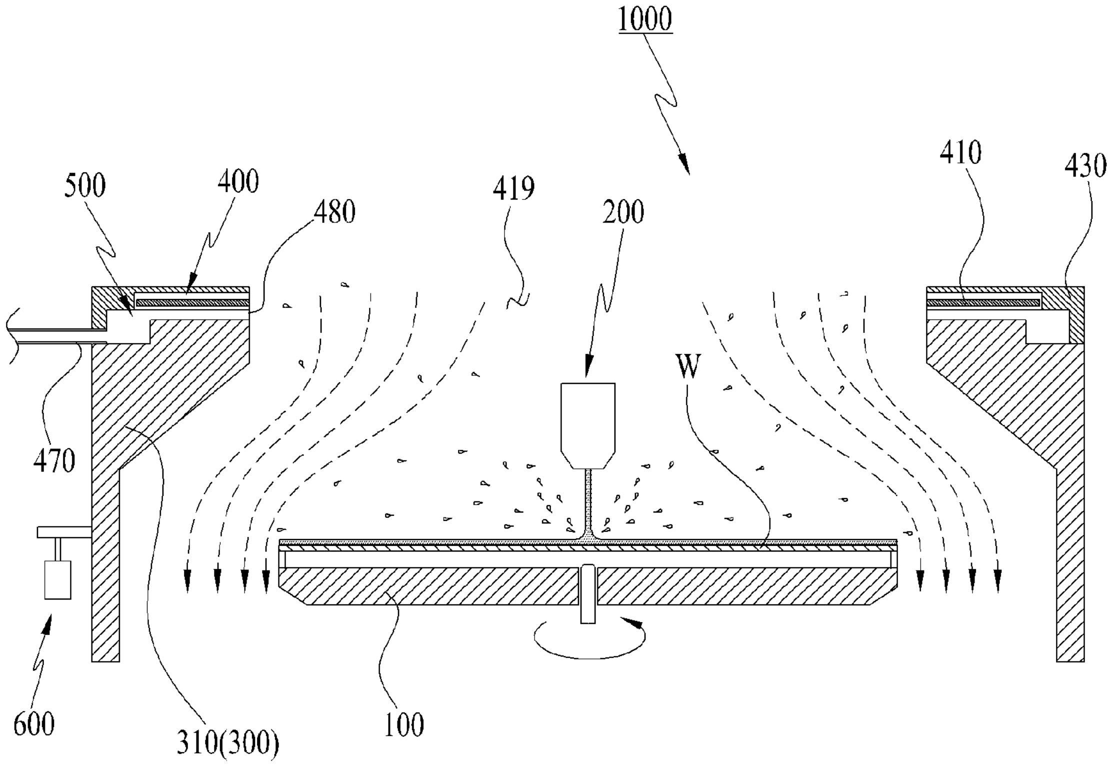
FIG. 2 is a longitudinal sectional view showing a substrate treatment apparatus according to the present disclosure, wherein a shutter unit is folded.
Figure 3:
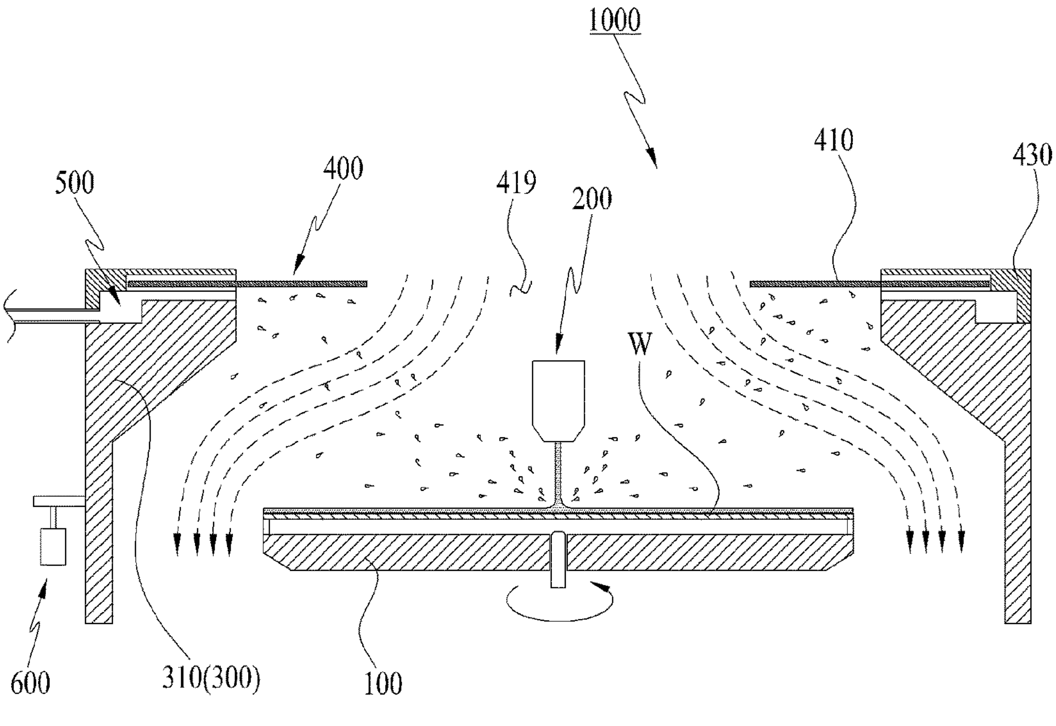
FIG. 3 is a longitudinal sectional view showing the substrate treatment apparatus according to the present disclosure, wherein the shutter unit is unfolded.

As shown in FIGS. 2 and 3, a substrate treatment apparatus 1000 according to the present disclosure includes a substrate support assembly 100 having a chuck base 100 rotating together with a substrate W in a state of supporting the substrate W thereagainst, a fluid supply unit 200 for supplying treatment liquid to the substrate W, a bowl assembly 300 having a plurality of bowls that overlap outward in a radial direction with respect to the center of the substrate in such a way as to surround the chuck base 100, an ascending and descending unit 600 for moving the bowl assembly up and down, and a shutter unit 400 disposed on top of the outermost bowl 310 of the bowl assembly 300 to adjust a radius of an air flow inlet 419 through which air flow passes toward the substrate W.

Like this, the open area of the air flow toward the substrate W is adjusted by means of the shutter unit 400 to control the speed of air flow introduced from a fan filter unit (not shown), so that the substrate W is prevented from being deteriorated in quality due to suction of gas-phase particles thereonto.

Further, the open area is adjusted to be narrow by means of the shutter unit 400, and when the treatment liquid is supplied to the rotating substrate W from the fluid supply unit 200, the outer surface of the bowl assembly 300 is prevented from being contaminated due to the treatment liquid scattered thereon.

Figure 4:
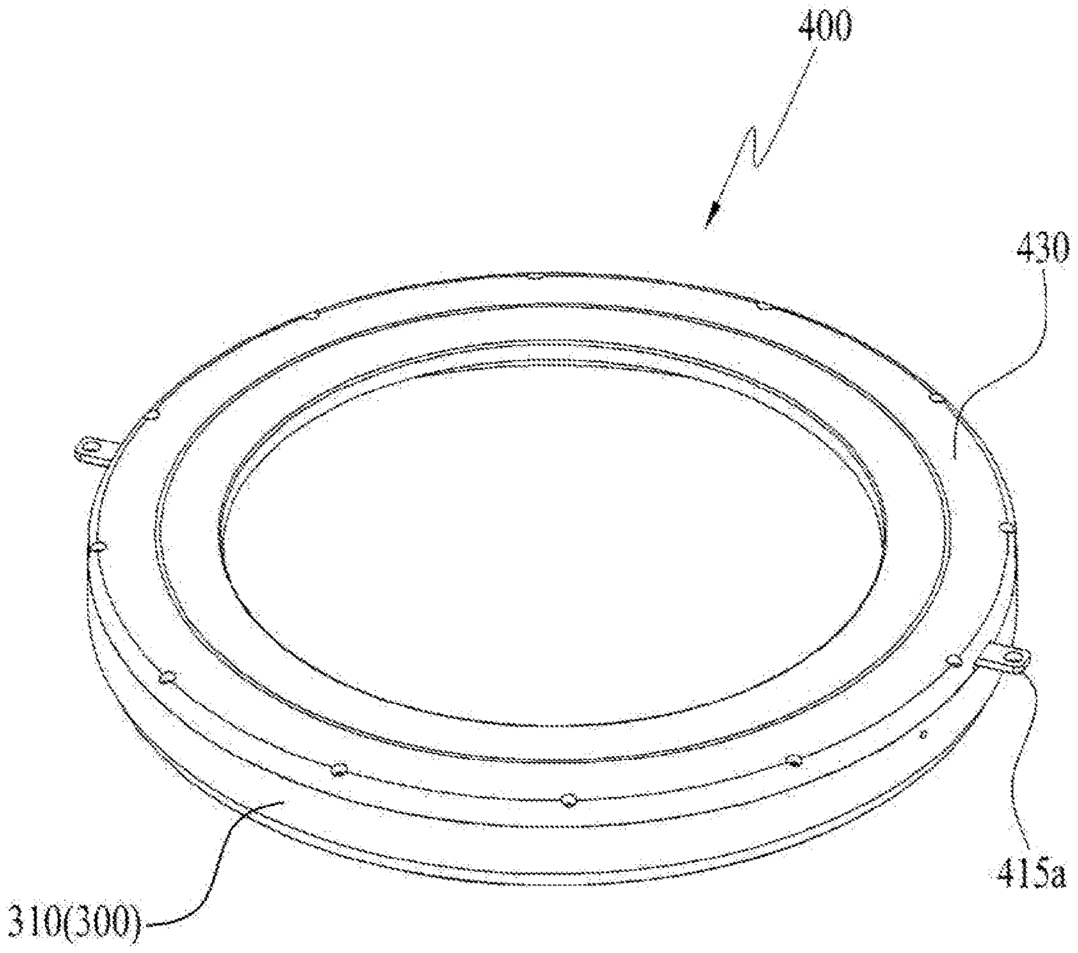
FIG. 4 is a perspective view showing a coupled configuration where the shutter unit and the outermost bowl of FIG. 2 are coupled to each other.
Figure 5:
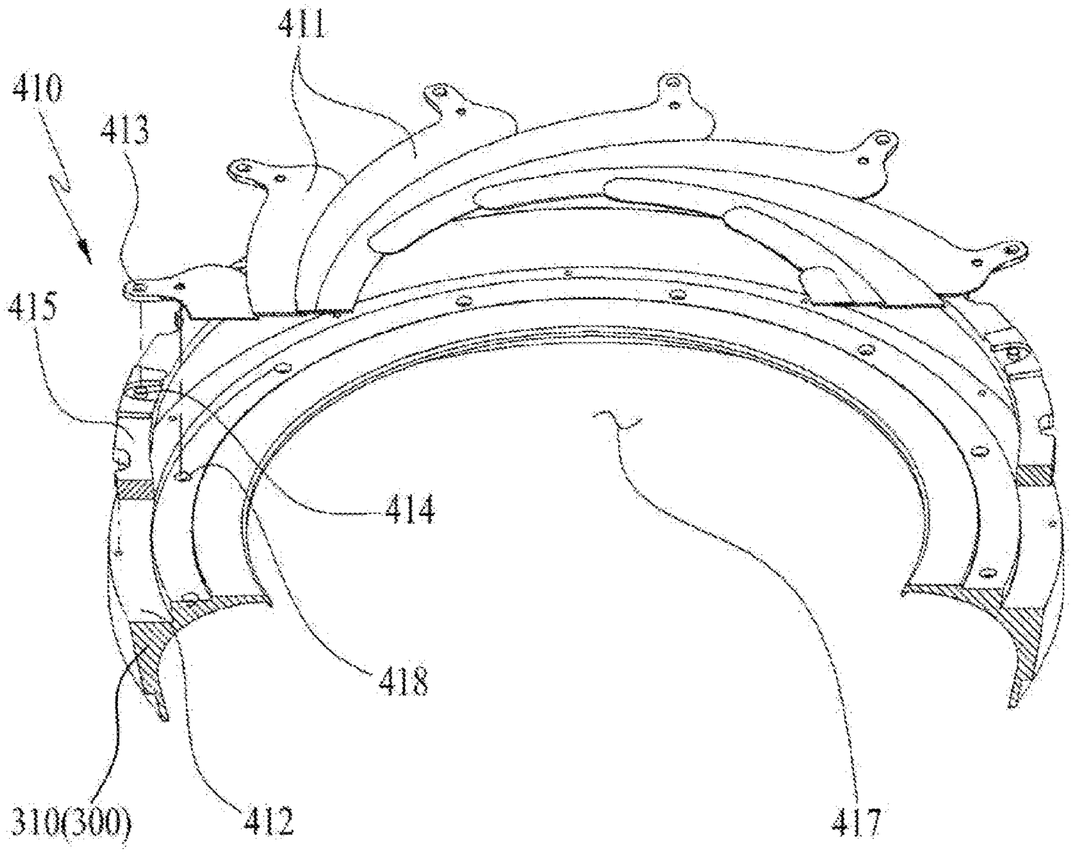
FIG. 5 is an exploded section perspective view showing a shutter member of the shutter unit and the outermost bowl of FIG. 4.
Figure 6:
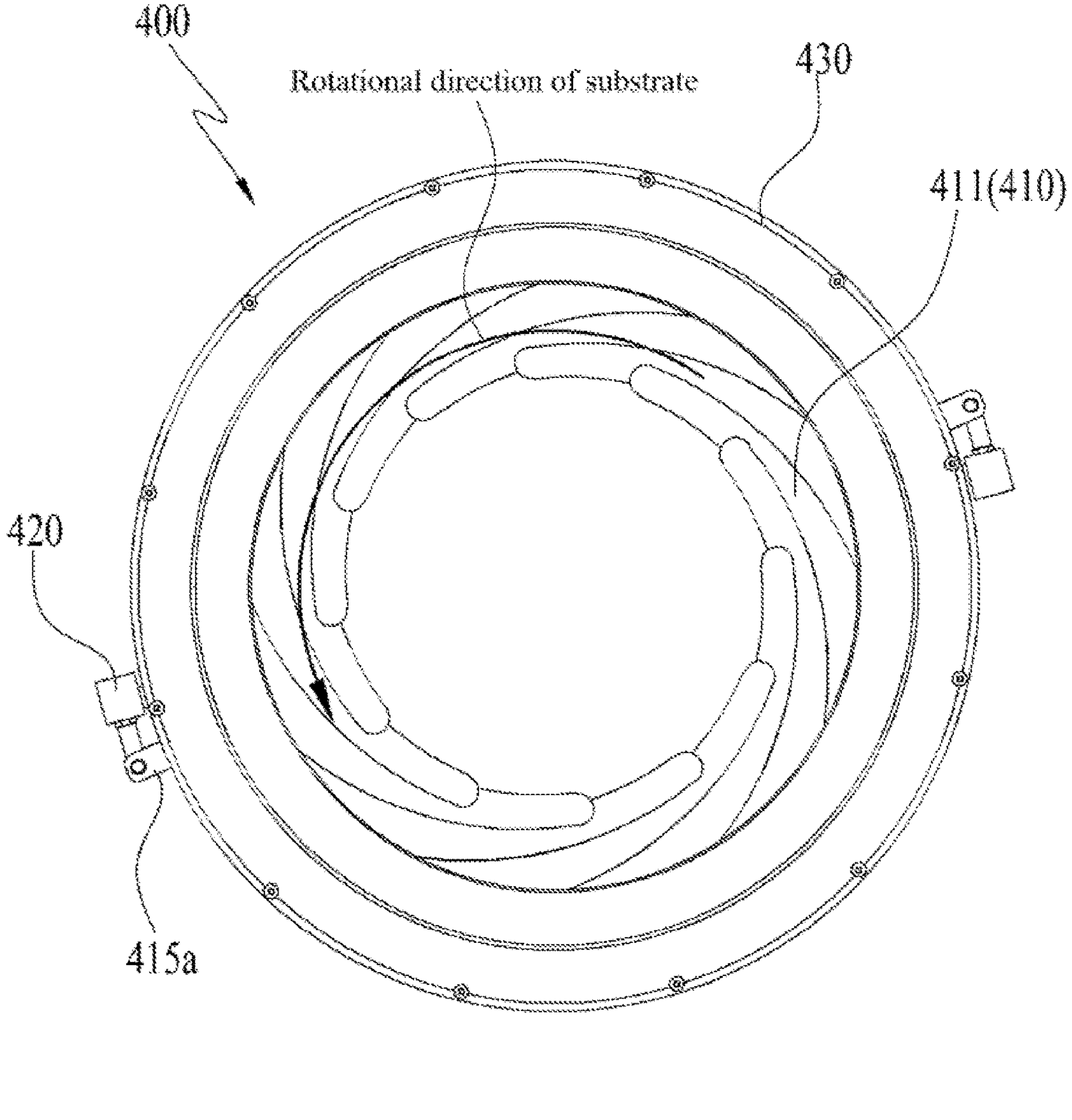
FIG. 6 is a plan view showing a state where the shutter member of FIG. 5 is unfolded.

As shown in FIGS. 4 to 6, the shutter unit 400 includes a housing frame 430 disposed on top of the outermost bowl 310, a shutter member 410 disposed between the top of the outermost bowl 310 and the housing frame 430 to adjust the radius of the air flow inlet 419, and shutter driving member 420 connected to the shutter member 410 to apply forces to the shutter member 410 so that the radius of the air flow inlet 419 is adjusted.

The shutter member 410 is unfolded or folded in a radial direction with respect to the center of the substrate W by means of the shutter driving member 420, and accordingly, the air flow inlet 419 is adjusted in radius to control the open area thereof.

In this case, the forces applied to the shutter member 410 from the shutter driving member 420 do not need to be necessarily in tangential directions, and it is enough that they just include tangential components.

Pressure (hydraulic or pneumatic) cylinders or a variety of known expansion and contraction devices may be used as the shutter driving member 420, and desirably, two or more shutter driving members 420 may be disposed in a circumferential direction with respect to the center of the substrate W.

The shutter driving members 420 are located on the housing frame 430 or the outermost bowl 310.

As shown in FIGS. 4 and 5, further, only the top of the outermost bowl 310 is shown, while the bottom thereof is being omitted.

The shutter member 410 has a plurality of shutter blades 411 equally spaced apart from one another in a circumferential direction of the outermost bowl 310 in such a way as to extend in a rotational direction of the substrate W, while being continuously overlaid on top of one another in the rotational direction of the substrate W.

The extension direction of the shutter blades 411 does not need to be same as the circumferential direction, and as shown, the shutter blades 411 extend to be misaligned with respect to the circumferential direction, while including circumferential components.

For example, as shown in FIG. 5, the shutter member 410 has the plurality of shutter blades 411 equally spaced apart from one another in the circumferential direction of the top 412 of the outermost bowl 310 in such a way as to be hingeable around hinge points 418 formed on the top of the outermost bowl 310, and a blade moving ring-shaped part 415 whose one side is connected to the shutter driving member 420 and the other side is connected relatively rotatable to the shutter blades 411 and having a through hole 417 penetrating into the center thereof.

In this case, the shutter blades 411 have guide holes 413 penetrating thereinto in the direction of the rotational axis of the substrate W, and the blade moving ring-shaped part 415 has rotation support pins 414 adapted to be inserted into the guide holes 413.

The hinge points 418, which are formed on a cleaning liquid flow path 510 as will be discussed later, are shown, but they may not be specifically limited in position.

In this case, the shutter driving member 420 is connected to moving plate connection pieces 415*a* of the blade moving ring-shaped part 415 in such a way as to apply the tangential forces with respect to the center of the substrate W to the blade moving ring-shaped part 415 to allow the blade moving ring-shaped part 415 to rotate in the rotational direction of the substrate W with respect to the top 412 of the outermost bowl 310, so that as the shutter blades 411 are additionally overlaid on top of one another to reduce the radius of the inner peripheral surface of the shutter member 410.

The moving plate connection pieces 415*a* are desirably located between the outermost bowl 310 and the housing frame 430.

The shutter blades 411 are made of materials influenced minimally by a high-temperature and high-density treatment liquid, such as polytetrafluoroethylene (PTFE), polyoxymethylene (PFA), polyvinylidene fluoride (PVDF), fluorinated ethylene propylene (FEP), and the like.

Figure 7:
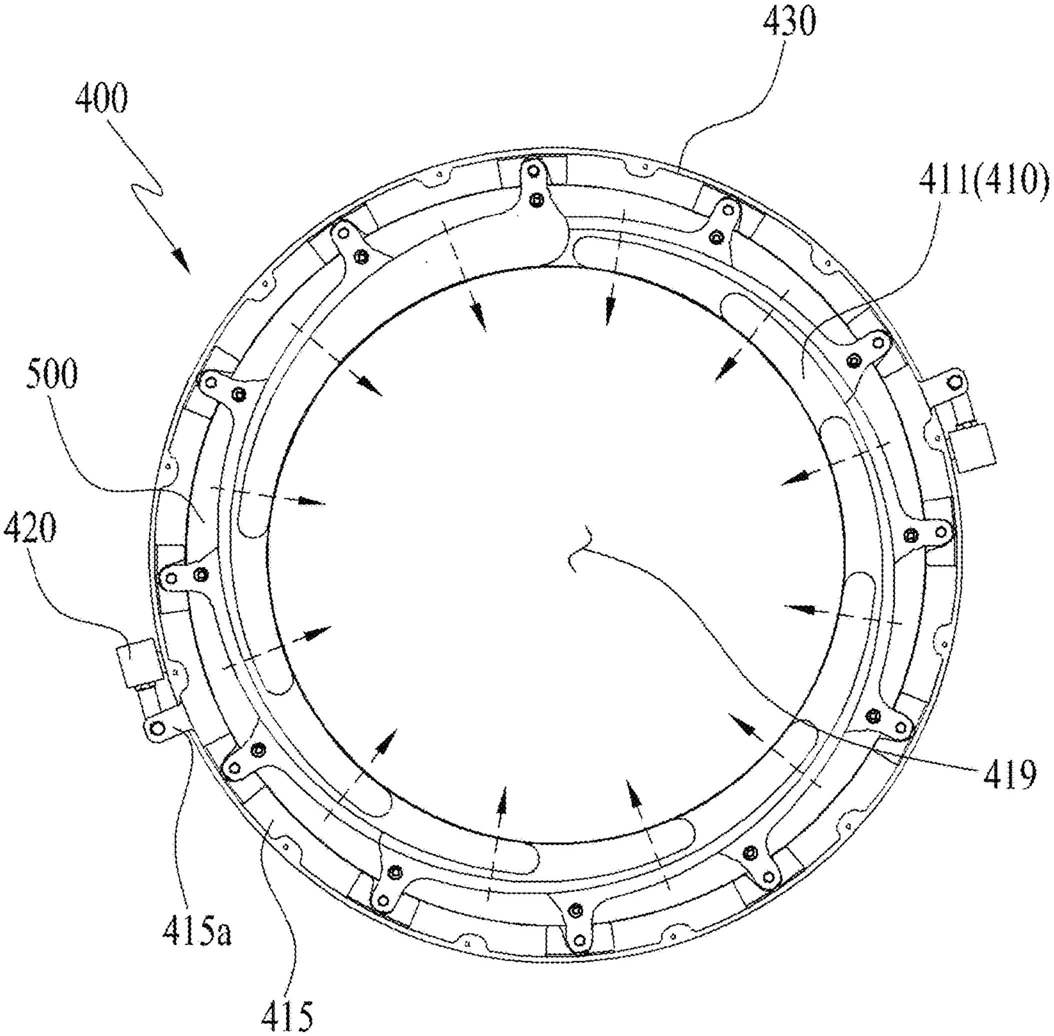
FIG. 7 is a plan view showing a state where the shutter member of FIG. 5 is folded.

As shown in FIGS. 6 and 7, the shutter blades 411 extend in the rotational direction of the substrate W, and when air moving down forms rotating air flow by means of the rotation of the substrate W, accordingly, the air flow is guided in the extension directions of the shutter blades 411 and smoothly flows toward the substrate W via the air flow inlet 419.

Further, if the treatment liquid for treating the substrate W scatters to the surfaces of the shutter blades 411 overlaid on top of one another and is accumulated thereon, the shutter member 410 may be malfunctioned, and during the substrate treatment process, besides, the contaminants of the treatment liquid accumulated on the shutter blades 411 are dropped to the substrate W, thereby causing a defective product.

After a given number of substrates W have been treated, therefore, the shutter blades 411 need to be cleaned to remove the contaminants accumulated thereon.

To do this, as shown in FIGS. 2, 3, 9, and 10, a cleaning liquid supply part 500 is disposed between the top 412 of the outermost bowl 310 and the housing frame 430 to supply a cleaning liquid to the shutter blades 411.

That is, the cleaning liquid supply part 500 serves to supply the cleaning liquid to the shutter blades 411 overlaid on top of one another in the housing frame 430, and the cleaning liquid flows naturally toward the air flow inlet 419 formed by the inner peripheral surfaces of the shutter blades 411 according to the property of the surface tension of the cleaning liquid and thus cleans the surfaces of the shutter blades 411.

Of course, the cleaning process for the shutter blades 411 is not performed during the substrate treatment process, but after a given number of substrates W have been treated, the cleaning process is performed before next substrate W is loaded.

In the drawings, the cleaning liquid supply part 500 is disposed between the top 412 of the outermost bowl 310 and the housing frame 430, but of course, the cleaning liquid supply part 500 may be located between a separate base plate (not shown) disposed on the top 412 of the outermost bowl 310 and the housing frame 430.

According to the present disclosure, the cleaning liquid supply part 500 may be the cleaning liquid flow path 510 extending in the circumferential direction in such a way as to be open toward the center of the shutter member 410.

The cleaning liquid flow path 510 has a cross-sectional shape like a water path and desirably extends in the circumferential direction with respect to the center of the substrate W, and further, the cleaning liquid is supplied from the outside via a path such as a tube, and the like.

Figure 9:
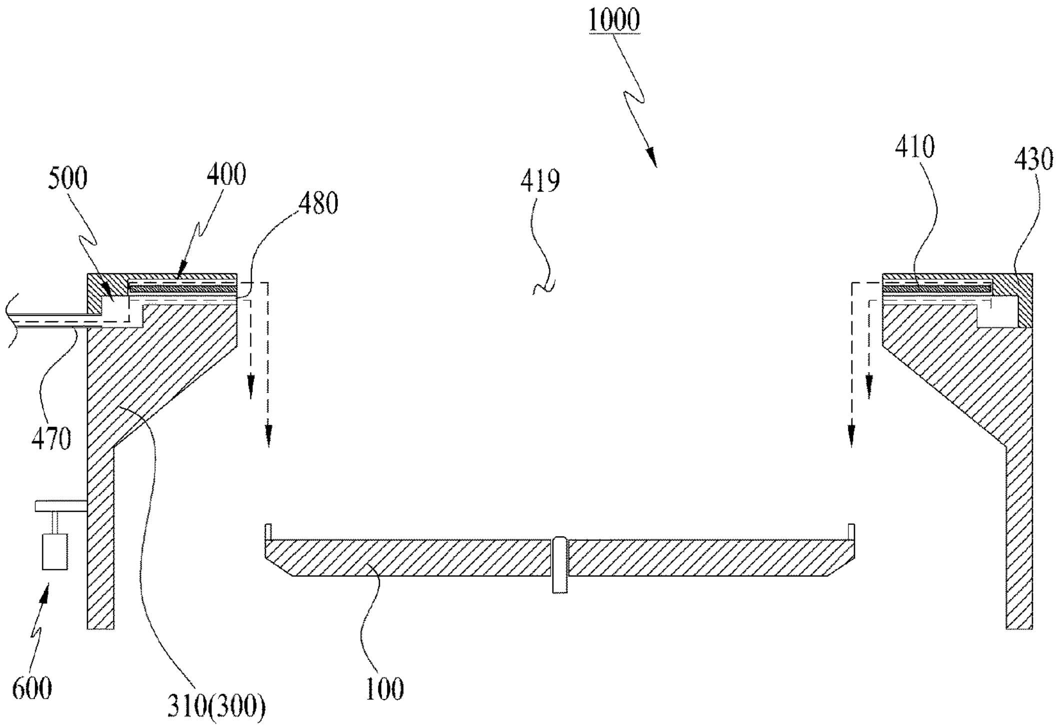
FIG. 9 is a longitudinal sectional view showing a configuration where in a state where the shutter unit is folded, a cleaning liquid is applied in the substrate treatment apparatus according to the present disclosure.
Figure 10:
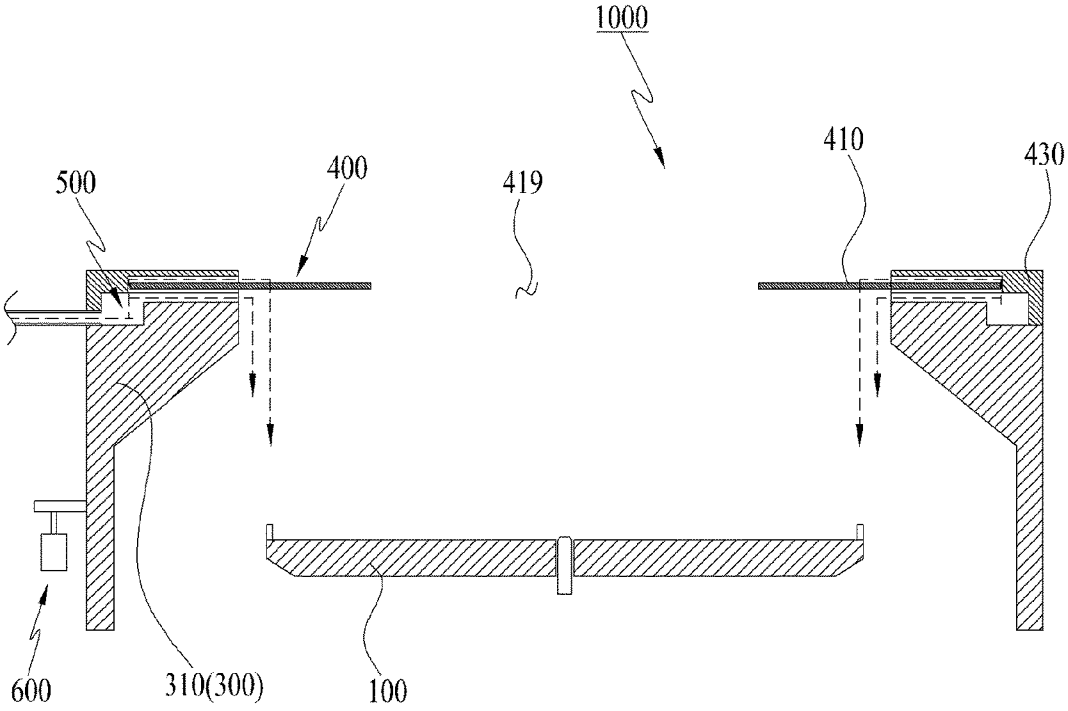
FIG. 10 is a longitudinal sectional view showing a configuration where in a state where the shutter unit is unfolded, the cleaning liquid is applied in the substrate treatment apparatus according to the present disclosure.

For example, as shown in FIGS. 9 and 10, the cleaning liquid is introduced into the cleaning liquid flow path 510 through an inlet port 470 disposed on the outside of the housing frame 430 and discharged through an entrance 480 through which the shutter blades 411 go in and out.

FIGS. 9 and 10 show a configuration in which the cleaning liquid enters through the inlet port 470 communicating with the cleaning liquid flow path 510, is supplied to the shutter blades 411, and is finally discharged through the entrance 480.

As shown, while the cleaning liquid is being supplied by the cleaning liquid supply part 500, the shutter blades 411 are repeatedly folded and unfolded to effectively remove the foreign substances caught thereamong.

Figure 8:
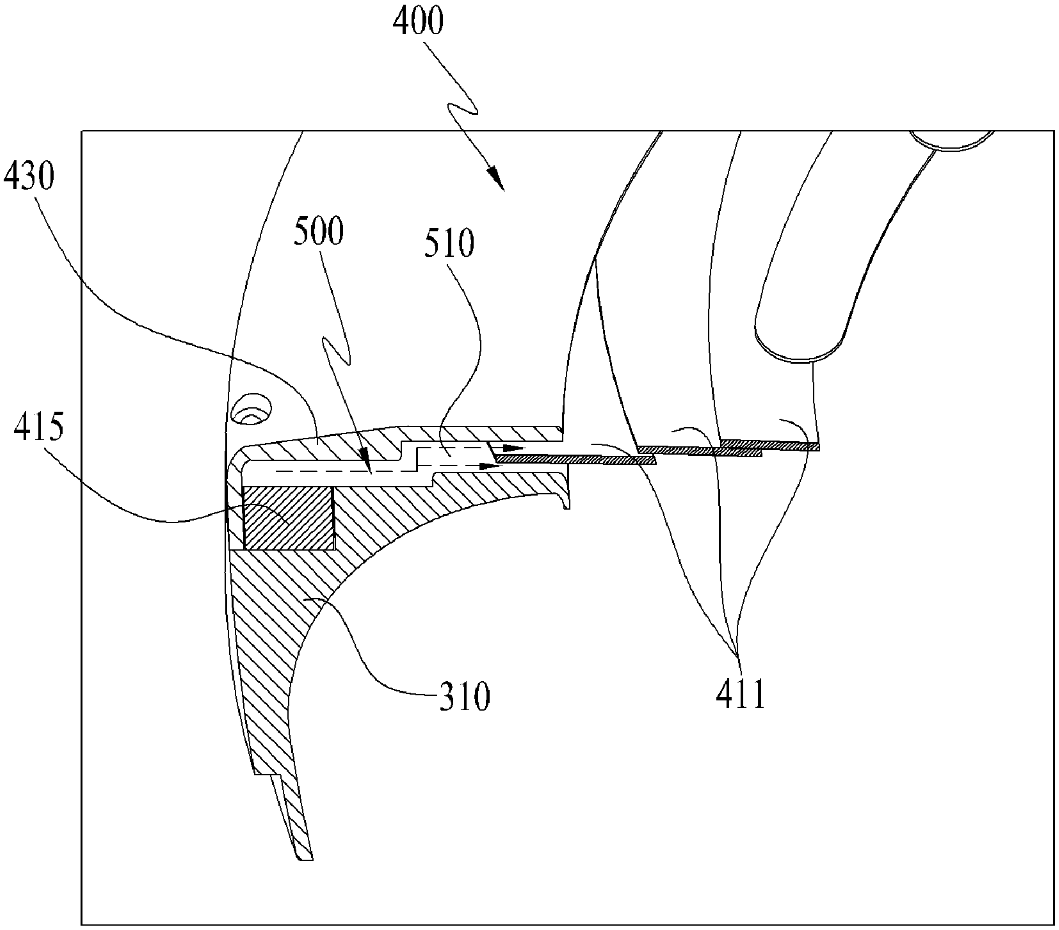
FIG. 8 is a cross-sectional view showing the shutter member of FIG. 5 in a circumferential direction.

As shown in FIG. 8, the blade moving ring-shaped part 415 is disposed between the housing frame 430 and the outermost bowl 310 in such a way as to face the cleaning liquid flow path 510.

As shown in FIGS. 8 to 10, the cleaning liquid flow path 510 has the shape of a ring extending in the circumferential direction with respect to the center of the substrate W to supply the cleaning liquid to the shutter blades 411 toward the inner peripheral surface thereof. The discharged cleaning liquid moves along the shutter blades 411 overlaid on top of one another according to the property of surface tension, is dropped to the inside of the bowl assembly 300, and is finally discharged to the outside.

As described above, the substrate treatment apparatus according to the present disclosure is configured to have the chuck base rotating together with the substrate in a state of supporting the substrate thereagainst, the fluid supply unit for supplying the treatment liquid to the substrate, the bowl assembly having the plurality of bowls that overlap outward in a radial direction with respect to the center of the substrate in such a way as to surround the chuck base, the ascending and descending unit for moving the bowl assembly up and down, and the shutter unit disposed on top of the outermost bowl of the bowl assembly to adjust a radius of an air flow inlet through which air flow passes toward the substrate, so that the open area of the air flow toward the substrate is adjusted by means of the shutter unit to control the speed of air flow introduced from the fan filter unit, thereby preventing the substrate from being deteriorated in quality due to sticking of gas-phase particles thereonto.

According to the present disclosure, further, the substrate treatment apparatus according to the present disclosure is configured to allow the open area to be adjusted to be narrow by means of the shutter unit so that when the treatment liquid is supplied from the fluid supply unit to the rotating substrate, the outer surface of the bowl assembly is prevented from being contaminated due to the treatment liquid scattered.

According to the present disclosure, moreover, the substrate treatment apparatus according to the present disclosure is configured to allow the shutter member to have the plurality of shutter blades equally spaced apart from one another in a circumferential direction of the outermost bowl in such a way as to extend in a rotational direction of the substrate, while being continuously overlaid on top of one another in the rotational direction of the substrate, so that when air moving down forms rotating air flow by means of the rotation of the substrate, the air flow is guided in the extension directions of the shutter blades and smoothly flows toward the substrate via the air flow inlet.

According to the present disclosure, also, the substrate treatment apparatus according to the present disclosure is configured to have the cleaning liquid supply part formed inside the housing frame to supply the cleaning liquid to the shutter blades, so that the cleaning liquid flows naturally toward the air flow inlet formed by the inner peripheral surfaces of the shutter blades according to the property of surface tension and thus cleans the undersides of the shutter blades.

The present disclosure may be modified in various ways and may have several exemplary embodiments. It is therefore intended that the scope of the disclosure be limited not by this detailed description, but rather by the claims appended hereto, and it should be understood that the disclosure covers all the modifications, equivalents, and replacements within the idea and technical scope of the disclosure.

What is claimed is:

1. A substrate treatment apparatus comprising:

a chuck base rotating together with a substrate in a state of supporting the substrate thereagainst;

a fluid supply unit for supplying treatment liquid to the substrate;

a bowl assembly having a plurality of bowls that overlap outward in a radial direction with respect to the center of the substrate in such a way as to surround the chuck base;

an ascending and descending unit for moving the bowl assembly up and down; and a shutter unit disposed on top of an outermost bowl of the bowl assembly to adjust a radius of an air flow inlet through which air flow passes toward the substrate, wherein the shutter unit comprises:

a housing frame disposed on top of the outermost bowl;

a shutter member disposed between the top of the outermost bowl and the housing frame to adjust the radius of the air flow inlet; and shutter driving member connected to the shutter member to apply forces to the shutter member so that the radius of the air flow inlet is adjusted, wherein the shutter member comprises:

the plurality of shutter blades equally spaced apart from one another in the circumferential direction of the top of the outermost bowl in such a way as to be hingeable around hinge points formed on the top of the outermost bowl; and a blade moving ring-shaped part whose one side is connected to the shutter driving member and the other side is connected relatively rotatable to the shutter blades, and the blade moving ring-shaped part having a through hole penetrating into the center thereof and being installed so as to be rotatable about the rotational axis of the substrate relative to the top of the outermost bowl.

2. The substrate treatment apparatus according to claim 1, wherein the shutter member has a plurality of shutter blades equally spaced apart from one another in a circumferential direction of the outermost bowl in such a way as to extend in a rotational direction of the substrate, while being continuously overlaid on top of one another in the rotational direction of the substrate.

3. The substrate treatment apparatus according to claim 2, wherein between the top of the outermost bowl and the housing frame is formed a cleaning liquid supply part adapted to supply a cleaning liquid to the shutter blades.

4. The substrate treatment apparatus according to claim 3, wherein the cleaning liquid supply part is a cleaning liquid flow path extending in the circumferential direction in such a way as to be open toward the center of the shutter member.

5. The substrate treatment apparatus according to claim 3, wherein while the cleaning liquid is being supplied by the cleaning liquid supply part, the shutter blades are repeatedly folded and unfolded.

6. The substrate treatment apparatus according to claim 4, wherein the blade moving ring-shaped part is disposed between the housing frame and the outermost bowl to face the cleaning liquid flow path.

* * * * *